United States Patent [19]

Yoshikawa et al.

[11] Patent Number: 4,887,102

[45] Date of Patent: Dec. 12, 1989

[54] IMAGE FORMING APPARATUS

[75] Inventors: Masao Yoshikawa, Tokyo; Tatuya Kobayashi, Yokohama, both of Japan

[73] Assignee: Canon Kabushiki Kaisha, Tokyo, Japan

[21] Appl. No.: 161,029

[22] Filed: Feb. 26, 1988

[30] Foreign Application Priority Data

Feb. 27, 1987 [JP] Japan .................................. 62-43025

[51] Int. Cl.[4] ...................... G03G 15/01; G01D 15/06

[52] U.S. Cl. .................................... 346/157; 355/246; 355/328

[58] Field of Search ............... 355/3 DD, 4, 245, 246, 355/268, 326, 328; 118/645; 346/157, 160

[56] References Cited

U.S. PATENT DOCUMENTS 4,308,821 1/1982 Matsumoto et al. ............... 355/4 X
4,349,268 9/1982 Hirata .................................. 355/328
4,416,533 11/1983 Tokunaga et al. ...................... 355/4
4,572,651 2/1986 Komatsu et al. ....................... 355/4
4,660,961 4/1987 Kuramoto et al. ..................... 355/4

FOREIGN PATENT DOCUMENTS 56-12650 2/1981 Japan .
56-144452 11/1981 Japan .

*Primary Examiner*—Fred L. Braun
*Attorney, Agent, or Firm*—Fitzpartick, Cella, Harper & Scinto

[57] ABSTRACT

An image forming apparatus includes a first developing device for forming a first toner image and a second developing device for forming a second toner image including a developer carrying member spaced apart from the image bearing member by a distance and a device for applying a developing bias voltage to form an electric field having a maximum voltage Vmax and a minimum voltage Vmin, such that when the first developer is positively charged, $|Vmin-V_T|/d \leqq 2.25$, or when the first developer is negatively charged, $|Vmax-V_T|/d \leqq 2.25$, where $V_T$(V) is a potential of a first toner image immediately before formation of the second toner image after the first latent image is subjected to the charger, the potential of the first toner image being a surface potential of the first toner image under existence of the first latent image.

20 Claims, 2 Drawing Sheets

IMAGE FORMING APPARATUS

FIELD OF THE INVENTION AND RELATED ART

The present invention relates to an image forming apparatus such as a printer, a copying machine or compound recording apparatus, more particularly to an image forming apparatus provided with means for forming plural developed images in different colors on an image bearing member, particularly such means as uses alternating electric field when a second developed image is to be formed.

Recently, a demand is increasing for an image forming apparatus capable of forming merged images on one side of a sheet, and an image forming apparatus equipped with plural developing devices has been put on sale. In one type of such machines, various proposals have been made that two developed images are formed by two developing devices through one turn of an image bearing member, the resultant merged images are simultaneously transferred onto a sheet.

For example, U.S. Pat. Nos. 4,572,651 and 4,416,533 propose such an apparatus wherein a DC bias voltage is used to provide a constant electric field in each of the two developing devices. Those patents are mainly directed to formation of the latent images, but do not deal with problems upon developing operations.

On the other hand, U.S. Pat. No. 4,349,268 or Japanese Laid-Open Patent Application No. 144,452/1981 discloses use of an AC developing bias in a non-contact development in the second developing operation. Japanese Laid-Open Patent Application 12650/1981 discloses use of a DC developing bias voltage in a non-contact development to prevent the second developer from rubbing and disturbing the first color developed image. The above mentioned Japanese Laid-Open Patent Application 144452/1981 does not disclose the potential of the first color developed image.

As understood, some proposals have been made as to methods for effecting a second development without disturbing the first developed image. From the similar standpoint, U.S. Pat. No. 4,660,961 discloses increasing the latent image potential of the first developed image.

SUMMARY OF THE INVENTION

The inventors have found an unknown problem in the second development. That is, when a great number of developed images are formed in the above described conventional developing devices, the toner of the first developed image is unintentionally mixed into the second developing device, with the result that the first color toner mixed into the second developer develops the second image in the second developing device, thus disturbing the quality of the image. This problem is particularly remarkable when the first and second toners or developers are electrically charged to the same polarity.

Accordingly, it is a principal object of the present invention to provide a solution to the problem that the toner of the first developed image is mixed into the second developing device.

It is another object of the present invention to provide an image forming apparatus equipped with two developing devices containing different color developers wherein, in the second developing operation, the first toner image is not disturbed, and simultaneously, the first toner is effectively prevented from mixing into the second developer, thus maintaining the quality of the merged image.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
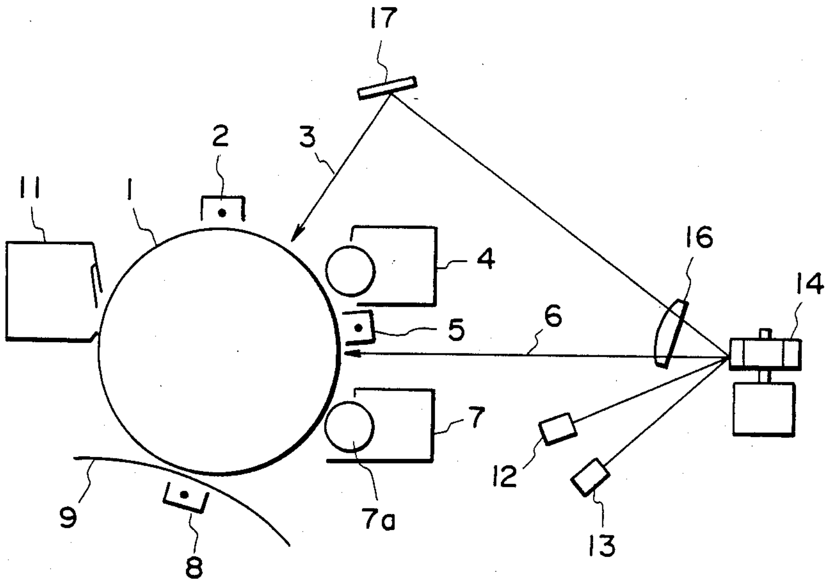
FIG. 1 is a somewhat schematic sectional view of an electrophotographic copying apparatus as an exemplary image forming apparatus according to an embodiment of the present invention.

Referring to FIG. 1, there is shown an electrophotographic copying apparatus as an exemplary image forming apparatus according to an embodiment of the present invention, which comprises a photosensitive member (an image bearing member) 1 on which an electrostatic latent image is formed, a primary charger for electrically and uniformly charging the surface of the photosensitive member 1 to a negative potential of approximately −600 V. The photosensitive member 1 is exposed to a first laser beam 3 after being subjected to the primary charger operation so that a first electrostatic latent image is formed on the photosensitive member 1. Upon the exposure by the laser beam 3, the surface potential of the photosensitive member becomes approx. −100 V. The apparatus further includes a first developing device 4 for forming a first toner image by developing the first electrostatic latent image with a two component developer containing a negatively charged red toner and magnetic particles made of ferrite, for example. A second charger 5 is disposed downstream of the first developing device 4 with respect to peripheral movement of the photosensitive drum 1 and is effective to charge the photosensitive member 1 having the first toner image to a negative polarity. By the charging, the potential of the first toner image is changed from −100 V to −600 V. The photosensitive member 1 is further exposed to a second laser beam 6, so that a second electrostatic latent image is formed thereon. Upon the exposure to the laser beam 6, the surface potential of the photosensitive member 1 becomes about −100 V. The apparatus further includes a second developing device 7 for forming a second toner image, the second developing device 7 being of a so-called jumping development type.

In the second developing device, a bias voltage which is a superimposed AC voltage and DC voltage is applied between the photosensitive member 1 and a developing sleeve 7*a*, and black one component magnetic toner having been negatively charged develops the second electrostatic latent image by a reversal development to form the second toner image. In the second developing device, the clearance between the sleeve and the first toner image is so set that they are out of contact.

The apparatus further comprises a transfer charger for simultaneously transferring the first and second toner images from the photosensitive member 1 to a transfer sheet 9, a cleaning device 11 for removing residual toner from the photosensitive member 1, first and second semiconductor lasers 12 and 13 for producing the first and second laser beams 3 and 6 modulated in accordance with first and second image signals, a rotatable mirror 14 (a polygonal mirror in this embodiment) for scanningly deflecting the first and second laser beams 3 and 6, and an imaging lens 16 for forming a spot on the photosensitive member 1 to raster-scan the surface of the photosensitive member 1. Designated by the reference 17 is a deflecting mirror to project the first laser beam onto the photosensitive member 1.

Figure 2A:
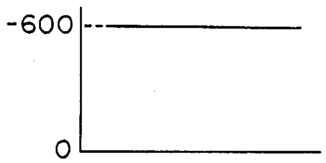
FIG. 2A to 2F are graphs showing potentials of a photosenstive member of FIG. 1 apparatus.
Figure 2D:
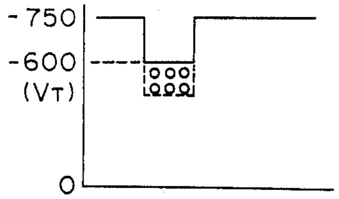
Figure 2B:
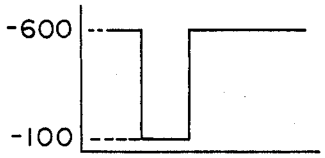
Figure 2E:
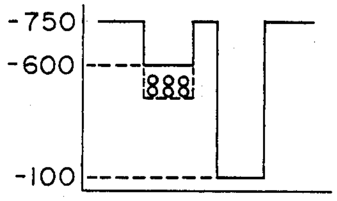
Figure 2C:
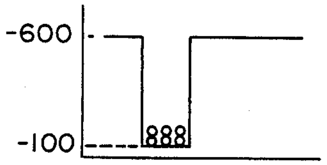
Figure 2F:
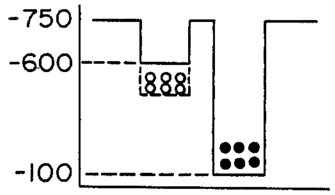

In operation, the primary charger 2 electrically charges the photosensitive member 1 to −600 V as shown in FIG. 2A, and the photosensitive member is exposed to the first laser beam 3 so that a first electrostatic latent image having a potential of −100 V is formed as shown in FIG. 2B. The first electrostatic latent image is developed by the developing device 4, so that the first toner image is formed as shown in FIG. 2C. Subsequently, the second charger 5 charges the photosensitive member 1 to a negative polarity, by which as shown in FIG. 2D, the potential of the first toner image (the surface potential of the first toner image resulting from both of the charge of the toner and the charge of the first electrostatic latent image) becomes −600 V. Then, the photosensitive member 1 is exposed to the second laser beam 6 so that the second electrostatic latent image of −100 V is formed as shown in FIG. 2D, which is then developed by the second developing device 7 into a second toner image as shown in FIG. 2F. Those merged or synthesized images are transferred simultaneously onto the transfer sheet 9 by the transfer charger 8.

Figure 3:
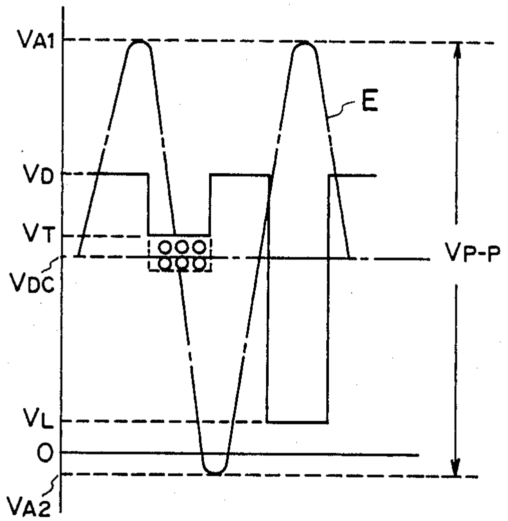
FIG. 3 is a graph showing a relation between the potential of the photosensitive member and an electric field provided by a developing bias voltage in FIG. 1 apparatus.

In the second developing device 7, a bias voltage E provided by superimposing an AC voltage of 1600 Hz and a DC voltage $V_D$ is applied between a developing sleeve *7a* of the second developing device 7 and the photosensitive member 1, as shown in FIG. 3. Therefore, two forces are applied to the first toner image, more particularly a force proportional to $|V_{A1}-V_T|$ in the direction of urging the toner toward the photosensitive member 1 because the toner is negatively charged, and a force proportional to $|V_T-V_{A2}|$ for driving the toner away from the photosensitive member 1. On the other hand, with respect to the second electrostatic latent image, there are two forces, namely, a force for development proportional to $|V_{A1}-V_L|$ and a force proportional to $|V_{A2}-V_L|$ for driving the toner away from the photosensitive member 1. Here, $V_{A1}$, $V_{A2}$ are minimum and maximum of the bias voltage, and $V_T$ is the potential of the first latent image.

The above described problem, that is, the second toner is contaminated with the first toner, is attributable to the force proportional to $|V_T-V_{A2}|$, in other words, to the electric field formed between the photosensitive member 1 and the developing sleeve *7a*. To investigate the problem, various experiments have been conducted using the above described electrophotographic copying apparatus.

EXPERIMENT 1

The developing sleeve *7a* was set so as to be spaced apart from the photosensitive member 1 by 300 microns. Developing operations were carried out with different peak-to-peak voltage Vpp of the AC component of the bias voltage E and with different voltage difference ΔV between the voltage $V_{DC}$ of the DC component of the bias voltage E and the potential $V_T$ of the toner image containing the latent image (surface potential of the toner image by the combination of the electric charge of the toner and the electric charge of the first electrostatic latent image). The contamination of the second toner was checked for the developing operations with different parameters described.

Table 1 shows the results of the experiments.

TABLE 1

| Vpp / ΔV | 800 | 900 | 1000 | 1100 | 1200 | 1300 |
|---|---|---|---|---|---|---|
| 0 | G (400) | G (450) | G (500) | G (550) | G (600) | G (650) |
| 50 | G (450) | G (500) | G (550) | G (600) | G (650) | F (700) |
| 100 | G (500) | G (550) | G (600) | G (650) | F (700) | N (750) |
| 150 | G (550) | G (600) | G (650) | F (700) | N (750) | N (800) |
| 200 | G (600) | G (650) | F (700) | N (750) | N (800) | N (850) |
| 250 | G (650) | F (700) | N (750) | N (800) | N (800) | N (900) |

( ): $V_{A2}$-$V_T$
G: No contamination
F: Slightly contaminated but tolerable
N: Untolerable contamination It is noted in the Table 1 that where the evaluation is "F", $V_{A2}-V_T=Vpp/2+\Delta V$ is 700 V.

If the parameters $V_{A2}$, $V_T$ and d satisfy the following relationship, the contamination of the second toner with the first toner can be prevented.

$$(V_{A2}-V_T)/d \leqq 700/300 = 2.3 \text{ [V/micron]}$$

Since $V_{A2}=V_{DC}+Vpp/2$, the above relationship is expressed:

$$(V_{DC}+Vpp/2-V_T)/d \leqq 2.3 \text{[V/micro] or,}$$

$$(V_{A2}-V_T) \leqq (V\max-V_T) \leqq 700 \text{ V}$$

EXPERIMENT 2

The developing sleeve *7a* was set so as to be spaced apart from the photosensitive member 1 by a distance d=400 microns. Similarly to experiment 1, developing operations were carried out with different peak-to-peak voltage Vpp of the AC voltage component of the bias voltage E and with different difference voltages ΔV between the first toner image potential $V_T$ and a DC voltage $V_{DC}$ of the DC component of the bias voltage E. After the developing operation, the contamination of the second toner was evaluated. The results are shown in Table 2 below.

TABLE 2

| Vpp / ΔV | 800 | 900 | 1000 | 1100 | 1200 | 1300 |
|---|---|---|---|---|---|---|
| 0 | G | G | G | G | G | G |
| 50 | G | G | G | G | G | G |
| 100 | G | G | G | G | G | G |
| 150 | G | G | G | G | G | G |
| 200 | G | G | G | G | G | F (900) |
| 250 | G | G | G | G | F (900) | N (950) |

It is noted in Table 2 that where the evaluation is "F", $V_{A2}-V_T=(Vpp/2+\Delta V)$ is 900 V, so that the toner removing electric field is $(V_{A2}-V_T)/d=900/400=2.25$ [V/microns].

Therefore, the contamination is prevented where $$(V_{A2}-V_T)/d \leqq 2.25 \text{ [V/microns]}$$

is satisfied.

Since $V_{A2}=V_D+Vpp/2$; the above relationship is expressed:

$$(V_D+Vpp/2-V_T)/d \leqq 2.25 \text{ [V/micron]}$$

EXPERIMENT 3

The distance d was set 200 microns. Similarly to Experiment 1, the toner contamination was evaluated. The results are shown in Table 3 below.

TABLE 3

| Vpp / ΔV | 800 | 900 | 1000 | 1100 | 1200 | 1300 |
|---|---|---|---|---|---|---|
| 0 | G (400) | F (450) | N (500) | N | N | N |
| 50 | F (450) | N (500) | N | N | N | N |
| 100 | N (500) | N | N | N | N | N |
| 150 | N | N | N | N | N | N |
| 200 | N | N | N | N | N | N |

It is noted in Table 3 that where the evaluation is "F", $V_{A2}-V_{TT}=(Vpp/2+V)$ is 450 V. Therefore, the toner removing electric field is:

$$(V_{A2}-V_T)/d=450/200=2.25 \text{ [V/micron]}$$

therefore, the contamination is prevented if $$(V_{A2}-V_T)/d \leqq 2.25 \text{ [V/micron]}$$

is satisfied. Similarly to Experiments 1 and 2, it is expressed:

$$(V_{DC}+Vpp/2-V_T)/d \leqq 2.25 \text{ [V/micron]}$$

From the above experiments, the preferable conditions are:

when the polarity of the first toner image is negative $$(V_{DC}+Vpp/2-V_T)/d \leqq 2.25 \text{ [V/micron], and}$$

when the polarity of the first toner is positive $$(V_T-V_{DC}+Vpp/2)/d \leqq 2.25 \text{ [V/micron]}$$

From the above experiments and considerations, it has been found that the toner of the first toner image is prevented from mixing into the second developing device 7 if the parameters $V_T$, $V_{DC}$ and Vpp satisfy the above, for a long period of use.

In the above described embodiment, the AC component of the bias voltage is in the form of a sine wave, but may be in the form of pulse or asymmetrical waveform.

As described, according to the embodiment, there is provided an electrophotographic copying apparatus including a first developing device for developing a first electrostatic latent image formed on an image bearing member, a charger for charging the first electrostatic latent image developed by the first developing device and a second developing device for developing a second electrostatic latent image formed on the image bearing member, wherein a bias voltage is applied between a developer carrying member of the second developing device and the image bearing member, characterized in that a peak-to-peak voltage Vpp of an AC component of the bias voltage, a voltage $V_D$ of a DC component of the bias voltage, a voltage $V_T$ of the first toner image charged by the charger and a distance d between the developer carrying member and the image bearing member, satisfy:

when the potential of the electrostatic latent image is positive:

$$(V_T-V_{DC}+Vpp/2)/d \leqq 2.25$$

when the potential of the electrostatic latent image is negative:

$$(V_{DC}+Vpp/2-V_T)/d \leqq 2.25.$$

By doing so, the second developing device is prevented from being contaminated with the toner of the first toner image for a long period of use.

The apparatus of the present invention is achieved, particularly noting the electric field strength of the vibratory electric field in the second developing device in relation to the potential of the latent image retaining the first developed image, and the toner of the first developed image is prevented from mixing into the second developing device. Therefore, the present invention is particularly effective in the case where a plural color image is formed, and particularly where the toner particles of different colors are charged to the same polarity, particularly where both toners are charged to negative polarity when the photosensitive member is exposed to image light by a laser beam.

According to the present invention, one of the following conditions is satisfied:

when the polarity of the toner of the first toner image is positively charged $$|Vmin-V_T|/d \leqq 2.25, \text{ or}$$

when the polarity of the toner of the first toner image is negative $$|Vmax-V_T|/d \leqq 2.25$$

where Vmax is a maximum potential of the vibratory electric field, Vmin is the minimum potential of the vibratory electric field, d is a clearance between the surfaces of the image bearing member and the developer carrying sleeve.

Further preferably, it is not more than 2.0 rather than 2.25, as will be understood from "G" marks in Tables 1—3. Particularly when the clearance d is 300 microns, $|Vmin-V_T|$ or $|Vmax-V_T|$ is not more than 700 V.

The present invention is applicable where one developing sleeve is used for the first and second developing devices, and where the developing sleeve carries the first toner supplied from a first container in the first development to function as the first developing means, and it carries the second toner supplied from the second container in the second development to function as the second developing means.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus for sequentially forming a first toner image and a second toner image on a surface of an image bearing member, comprising:

developing means for developing first and second electrostatic latent images into the first and second toner images by a first developer including positively charged toner and a second developer, respectively;

wherein said developing means includes a developer carrying member for carrying the second developer spaced apart from said image bearing member by a distance d so as not to contact the first toner image, and means for applying a developing bias AC voltage which varies between a maximum voltage Vmax and minimum voltage Vmin to said developer carrying member to form an electric field between said image bearing member and said developer carrying member, wherein $$|Vmin-V_T/d \leqq 2.25 \text{ (V/micron)},$$

where $V_T$(V) is a potential of the first toner image immediately before formation of the second toner image by said developing means, the potential of the first toner image being a surface potential of the first toner image under existence of the first latent image.

2. An apparatus according to claim 1, wherein the following is satisfied $$|Vmin-V_T|/d \leqq 2.0 \text{ (V/micron)}.$$

3. An apparatus according to claim 1, wherein said developing means includes an additional developer carrying member for the first developer.

4. An apparatus according to claim 1, wherein a difference $\Delta V$ between $V_T$ and $V_{DC}$ which is equal to (Vmax−Vmin)/2 is not more than 250 V.

5. An apparatus according to claim 1, wherein the voltage $V_T$ is a voltage after said image bearing member is re-charged by recharging means.

6. An image forming apparatus, comprising:

a movable image bearing member;

electrostatic latent image forming means for forming a first electrostatic latent image and a second electrostatic latent image on said image bearing member;

first developing means for forming a first toner image by developing the first electrostatic latent image by a first developer including positively charged toner;

means for charging said first toner image, said charging means being disposed downstream of said first developing means with respect to movement of said image bearing member;

second developing means disposed downstream of said charging means for forming a second toner image by developing the second electrostatic latent image with a second developer, said second developing means including a developer carrying member for carrying the second developer spaced apart from said image bearing member by a distance d so as not to contact the first toner image, and means for applying a developing bias AC voltage which varies between a maximum voltage Vmax and a minimum voltage Vmin to said developer carrying member to form an electric field between said image bearing member and said developer carrying member, wherein $$|Vmin-V_T|/d \leqq 2.25 \text{ (V/micron)},$$

where $V_T$ (V) is a potential of a first toner image immediately before formation of the second toner image by said second developing means and after the first latent image is subjected to an operation of said charging means, the potential of the first toner image being a surface potential of the first toner image under existence of the first latent image.

7. An apparatus according to claim 6, wherein $$|Vmin-V_T|/d \leqq 2.0 \text{ (V/micron)}.$$

8. An apparatus according to claim 6, wherein |Vmax−Vmin| is not less than 800 V and not more than 1300 V.

9. An image forming apparatus for sequentially forming a first toner image and a second toner image on a surface of an image bearing member, comprising:

developing means for developing first and second electrostatic latent images into the first and second toner images by a first developer including negatively charged toner and a second developer, respectively;

wherein said developing means includes a developer carrying member for carrying the second developer and spaced apart from said image bearing member by a distance d so as not to contact the first toner image, and means for applying a developing bias voltage which varies between a maximum voltage Vmax and a minimum voltage Vmin, to said developer carrying member to form an electric field between said image bearing member and said developer carrying member, the electric field having a direction alternately changing, wherein the following is satisfied:

$$|Vmax-V_T|/d \leqq 2.25 \text{ (V/micron)},$$

where $V_T$ (V) is a potential of the first toner image immediately before formation of the second toner image by said developing means, the potential of the first toner image being a surface potential of the first toner image under existence of the first latent image.

10. An apparatus according to claim 9, wherein the following is satisfied $$|Vmax-V_T|/d \leqq 2.0 \text{ (V/micron)}.$$

11. An apparatus according to claim 9, wherein said developing means includes an additional developer carrying member for the first developer.

12. An apparatus according to claim 9, wherein a difference between $V_T$ and (Vmax−Vmin)/2 is not more than 250 V.

13. An apparatus according to claim 9, wherein the voltage $V_T$ is a voltage after said image bearing member is re-charged by recharging means.

14. An apparatus according to claim 9, wherein the first and second developers are negatively charged, and wherein the images to be developed by said first and second developing means are negative.

15. An image forming apparatus, comprising:

a movable image bearing number;

electrostatic latent image forming means for forming a first electrostatic latent image and a second electrostatic latent image on said image bearing member;

first developing means for forming a first toner image by developing the first electrostatic latent image by a first developer including negatively charged toner;

means for charging said first toner image, said charging means being disposed downstream of said first developing means with respect to movement of said image bearing member;

second developing means disposed downstream of said charging means for forming a second toner image by developing the second electrostatic latent image by a second developer, said second developing means including a developer carrying member for carrying the second developer and spaced apart from said image bearing member by a distance d so as not to contact the first toner image, and means for applying a developing bias voltage which varies between a maximum voltage Vmax and a minimum voltage Vmin, to said developer carrying member and said developer carrying member, the electric field having a direction alternately changing, wherein the following is satisfied:

$$|V\max - V_T|/d \leqq 2.25 \text{ (V/micron)},$$

where $V_T$ (V) is a potential of a first toner image immediately before formation of the second toner image by said second developing means and after the first latent image is subjected to an operation of said charging means, the potential of the first toner image being a surface potential of the first toner image under existence of the first latent image.

16. An apparatus according to claim 15, wherein the following satisfied $$|V\max - V_T|/d \leqq 2.0 \text{ (V/micron)}.$$

17. An apparatus according to claim 15, wherein Vmax−Vmin is not less than 800 V and not more than 1300 V.

18. An apparatus according to claim 9, wherein the first and second developers are negatively charged, and wherein the images to be developed by said first and second developing means are negative.

19. An image forming apparatus, comprising:

a movable electrophotographic photosensitive member;

first charging means for charging said photosensitive member to a predetermined polarity;

first exposure means for exposing said photosensitive member charged by said first charging means to first information light to form a first electrostatic latent image;

first developing means for developing the first electrostatic latent image with first toner to form a first toner image, wherein the first toner is charged to the predetermined polarity, and wherein the first developing means deposits the first toner to that portion of said photosensitive member exposed to the first information light;

second charging means for charging the first toner image with a charge having a polarity the same as that of the first toner;

second exposure means for exposing said photosensitive member acted on by said second charging means to second information light to form a second electrostatic latent image; and second developing means for developing the second electrostatic latent image with the second toner charged to the same polarity as the first toner to form a second toner image on the photosensitive member having the first toner image thereon;

wherein said second developing means includes a rotatable developer carrying sleeve for carrying the second toner and deposits the second toner to that portion of said photosensitive member exposed to the second information light; and wherein the developer carrying the sleeve of said second developing means is supplied with a bias voltage having an AC component which varies between a maximum voltage Vmax and a minimum voltage Vmin, wherein when the first toner is negatively charged, $$|V\max - V_T/d \leqq 2.25 \text{ (V/micron)},$$

where d is a clearance between said developer carrying sleeve and said photosensitive member, and $V_T$ is a potential of the first toner charged by said second charging means.

20. An image forming apparatus, comprising:

a movable electrophotographic photosensitive member;

first charging means for charging said photosensitive member to a predetermined polarity;

first exposure means for exposing said photosensitive member charged by said first charging means to first information light to form a first electrostatic latent image;

first developing means for developing the first electrostatic latent image with first toner to form a first toner image, wherein the first toner is charged to the predetermined polarity, and wherein said first developing means deposits the first toner to that portion of said photosensitive member exposed to the first information light;

second charging means for charging the first toner image with a charge having a polarity the same as that of the first toner;

second exposure means for exposing said photosensitive member acted on by said second charging means to second information light to form a second electrostatic latent image; and second developing means for developing the second electrostatic latent image with second toner charged to the same polarity as the first toner to form a second toner image on the photosensitive member having the first toner image thereon;

wherein said second developing means includes a rotatable developer carrying sleeve for carrying the second toner and deposits the second toner to that portion of said photosensitive member exposed to the second information light; and wherein the developer carrying sleeve of said second developing means is supplied with a bias voltage having an AC component which varies between a maximum voltage Vmax and minimum voltage Vmin, wherein when the first toner is positively charged, $$|V\min - V_T/d \leqq 2.25 \text{ (V/micron)}$$

where d is a clearance between said developer carrying sleeve and said photosensitive member, and $V_T$ is a potential of the first toner charged by said second charging means.

* * * * *

UNITED STATES PATENT AND TRADEMARK OFFICE

CERTIFICATE OF CORRECTION

PATENT NO. : 4,887,102

DATED : December 12, 1989

INVENTOR(S) : MASAO YOSHIKAWA, ET AL.

It is certified that error appears in the above-identified patent and that said Letters Patent is hereby corrected as shown below:

COLUMN 4

Line 40, "V/micro" should read --V/micron--.

COLUMN 5

Line 31, "Vpp/2+V" should read --Vpp/2+ΔV--.

COLUMN 7

Line 23, "$|Vmin-V_T/d$" should read --$|Vmin-V_T|/d$--.
Line 31, "satisfied" should read --satisfied:--.

COLUMN 8

Line 49, "satisfied" should read --satisfied:--.

COLUMN 9

Line 36, "satisfied" should read --is satisfied:--

UNITED STATES PATENT AND TRADEMARK OFFICE
CERTIFICATE OF CORRECTION

PATENT NO. : 4,887,102

DATED : December 12, 1989

INVENTOR(S) : MASAO YOSHIKAWA, ET AL.

It is certified that error appears in the above-identified patent and that said Letters Patent is hereby corrected as shown below:

COLUMN 10

Line 17, "$|Vmax-V_T/d$" should read --$|Vmax-V_T|/d$--.

Line 62, "$|Vmin-V_T/d$" should read --$|Vmin-V_T|/d$--.

Signed and Sealed this

Fifth Day of May, 1992

*Attest:*

DOUGLAS B. COMER

*Attesting Officer* *Acting Commissioner of Patents and Trademarks*